Dec. 30, 1930. K. BERG 1,786,641
CHAIN SAW
Filed Sept. 4, 1928
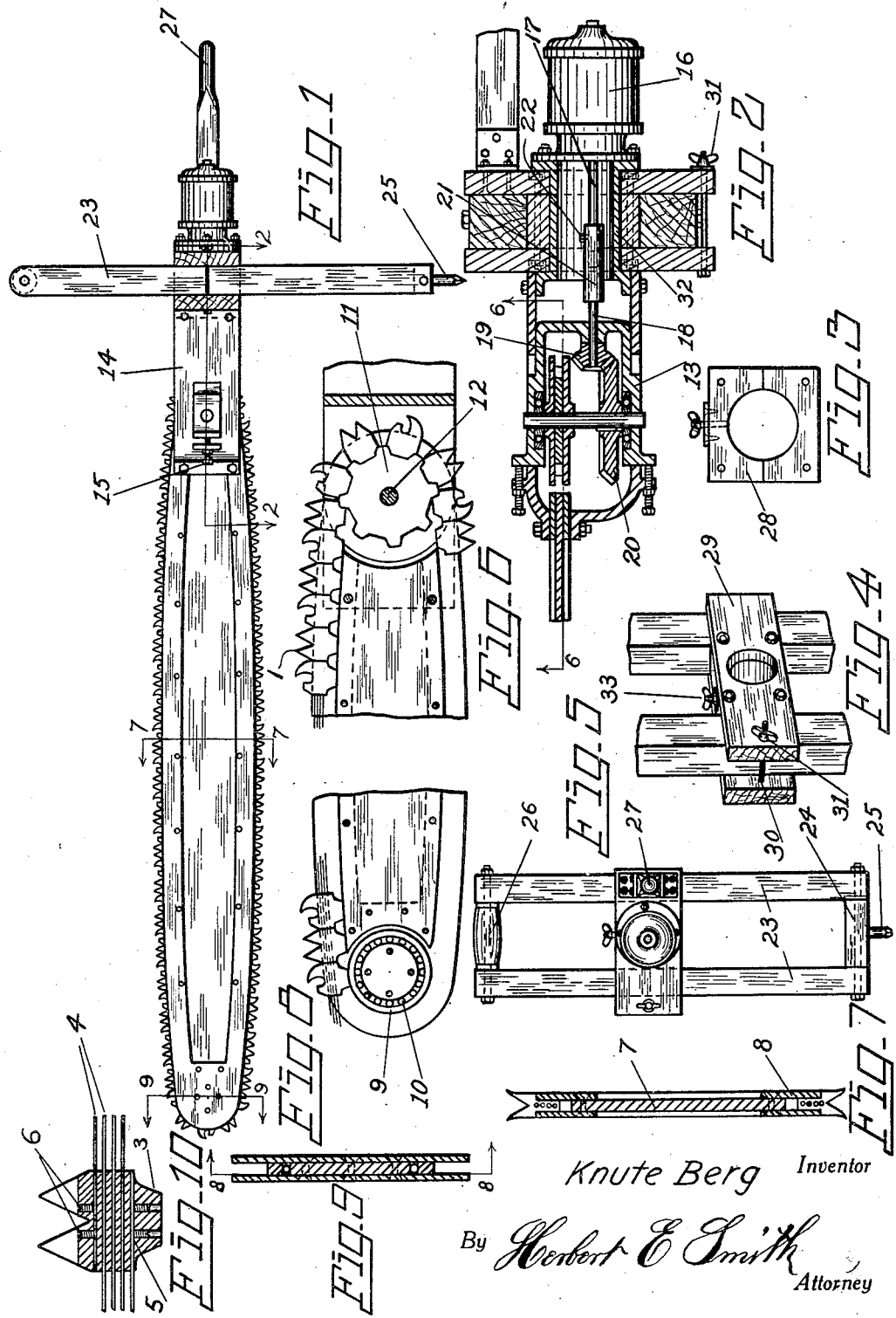
Knute Berg Inventor
By Herbert E. Smith
Attorney Patented Dec. 30, 1930

1,786,641

UNITED STATES PATENT OFFICE

KNUTE BERG, OF SPOKANE, WASHINGTON

CHAIN SAW

Application filed September 4, 1928. Serial No. 303,845.

My present invention relates to an improved chain saw of the power operated type and adapted for control by one man. The saw of my invention is adapted for use in felling standing timber as well as for sawing the timber into logs, and means are provided whereby the saw may be adjusted and retained in vertical position, horizontal position, or at an angle between these two positions, thus securing a maximum range in the operations of the saw.

While the saw is nominally termed a chain saw, the structure of the saw per se embodies the use of a plurality of alternately arranged cutting and raker teeth that are "strung" on or carried on a coiled, single, cable, and the ends of the wire are secured to one and the same tooth of the saw. The coiled wire passes through openings or holes in the respective teeth and a flexible "chain" is thus secured, and supported on the drive and driven sprockets of the saw.

A supporting frame is provided for the apparatus or appliance and means are provided whereby the saw may move by gravity under guidance of the frame and the weight of the operating parts of the saw, to feed the teeth to the kerf being cut. Adjustments for operating the saw at different angles may with facility be secured, and the invention as embodied provides a comparatively light, power operated appliance that may be manipulated and controlled by one man.

The invention consists in certain novel combinations and arrangements of parts as will hereinafter be more fully set forth and claimed. In the accompanying drawings I have illustrated one complete example of the physical embodiment of my invention wherein the parts are combined and arranged according to the best mode I have thus far devised for the practical application of the principles of my invention.

Figure 1 is a view in side elevation of an appliance or implement embodying my invention, with the saw in position for a vertical cut. Figure 2 is an enlarged detail sectional view at line 2—2 of Figure 1, showing the motor, driving and transmission mechanism and bearings therefor. Figure 3 is a face view of the split bearing block forming part of the gravity actuated cross head of the feed device. Figure 4 is a perspective view showing part of the supporting frame for the saw and vertically moving cross head of the feed device. Figure 5 is a view in elevation showing the supporting frame and motor, together with the cross head. Figure 6 is an enlarged, broken view in side elevation, partly in section as at line 6—6 of Figure 2 showing the drive sprocket, chain saw and guides. Figure 7 is an enlarged transverse sectional view at line 7—7 of Figure 1. Figure 8 is a view similar to the structure of Figure 6 at the outer end of the saw showing the driven sprocket and its bearing. Figure 9 is a detail transverse sectional view at line 9—9 of Figure 1. Figure 10 is an enlarged, detail vertical sectional view of a tooth showing the coiled wire passed through holes therein and the two ends of the wire anchored to the tooth.

The saw is fashioned as an endless, flexible belt or band and comprises alternately arranged cutting teeth 1 and raker teeth 2 having enlarged bearing heads or backs 3. All of the teeth are "strung" upon a single wire 4 that is passed through parallel, spaced holes 5 in the respective teeth, and both ends of this wire are anchored or firmly secured to a single tooth as by means of set bolts or screws 6. The teeth are alternately arranged in close frictional contact and the endless belt or band forming the chain saw travels around the outside of a saw guide or frame having an exterior groove through which the backs or heads of the teeth pass. The saw frame comprises a central, flat plate 7 of suitable length and a pair of side guide plates 8 are riveted at opposite sides of the edge of this central plate to form grooves or guides in which the teeth travel, and of course one of the flights of the endless belt is used as the working flight of the saw.

The endless saw belt or band is supported at its outer end on a driven pulley 9 having ball bearings 10 in the end of the saw frame, the bearings being fashioned in the ends of the complementary side plates of the frame as they project beyond the end of the central plate or blade 7. The saw belt also passes around a drive sprocket 11 on the gear shaft 12 that is located in a plane at right angles to the movement of the saw and journaled in slide blocks or slide bearings 13.

The slide bearings are supported in a slotted housing 14 and these bearings may be adjusted in the slotted housing to take up wear of the saw belt and to provide the proper tautness of the belt, and screw bolts 15, one at each side of the housing, are used for this purpose.

The endless saw belt is driven through its sprockets from an electric motor 16 that is carried by the portable appliance, and the shaft 17 of the motor transmits power to the drive shaft 18 alined therewith. The drive shaft has bearings in the housing or slide-bearing 13, and a pinion 19 on this shaft meshes with a complementary bevel gear 20 on the gear shaft to drive the sprocket 11.

Inasmuch as the drive shaft is relatively movable on its longitudinal axis (with the slide bearing) for the purpose of tightening or slackening the saw belt, in its relation to the stationary motor shaft, a slip sleeve 21 is used to couple the adjoining ends of the motor shaft and the drive shaft, and the parts may be secured by means of a set bolt or screw 22 threaded into the sleeve and impinging against the motor shaft.

The operating parts of the appliance are supported upon a supporting frame or upright, of rectangular shape that comprises a pair of spaced, side bars 23, a rigid, bottom cross bar 24 and its stud pin 25, an upper cross bar 26 bolted between the side bars to form a handle, and a second handle 27 rigidly bolted to one of the cross bars 29 and projecting from the frame in the plane in which the saw-belt travels. The stud pin 25 is allowed to penetrate the ground, a supporting board, or a floor and is used as a vertically arranged pivot for swinging the appliance in a horizontal plane to present the saw belt in desired operative position, and the two handles 26 and 27 are grasped for this purpose, as well as for holding the supporting frame and operating parts in operative position.

Assuming that the saw belt is cutting a fallen timber into logs and the saw is operating in a vertical plane, as the work proceeds the saw and its frame and its operating parts, move downwardly, by gravity to feed the saw teeth into the kerf. For this purpose I utilize a cross head in combination with the supporting frame and support the operating parts of the appliance in this cross head. The cross head includes a split or sectional bearing block 28 having a central round opening therein, and a pair of cross bars 29 to which the split bearing block is bolted. The bearing block is located between the adjoining inner faces of the side bars and the two cross bars are located at the outer sides of the side bars in order that the block may travel up or down within the supporting frame and be guided by the cross bars. Complementary ends of the cross bars project beyond the outer edge of one of the side bars and a bolt 30 and nut 31 are used in these complementary ends to clamp the cross head on the frame when desired, but of course this clamp device is loosened when the saw is designed to feed under the weight of the operating parts.

A flanged coupling sleeve 32 is carried in the split bearing block and at its respective ends it is bolted to the housing 14 at one side of the supporting frame and to the motor casing at the other side of the frame. By the use of this coupling sleeve in the split bearing block the belt saw, its frame, the driving and transmission mechanism, and the motor, may be turned to present the belt saw at a desired angle between the horizontal and vertical positions, and then by means of a set bolt or screw 33 in the split bearing block (which bolt is adapted to impinge against the exterior face of the coupling or bearing sleeve) the sleeve may be held in rigid relation to the cross head for supporting the saw in its angular position.

Having thus fully described my invention, what I claim as new and desire to secure by Letters Patent is:—

1. The combination in a sawing appliance with a supporting structure, of a vertically movable cross head and means for securing the cross-head in vertically adjusted position, a tubular coupling member supported in the cross head and adjustable for turning on its longitudinal axis, a motor fixed to the member at one side of the structure and a transmission housing fixed to the member at the other side of the housing, driving mechanism from the motor operating in the member and transmission mechanism in the housing, a saw frame supported on the housing, and an endless chain saw supported in the saw frame.

2. The combination in a portable sawing appliance with a saw frame and saw belt, of a housing secured to the frame, a motor, and a sleeve coupling the motor to the housing, a supporting structure having a bearing for the sleeve so that the latter may be turned around its longitudinal axis, a driven pulley journaled in the frame, a drive sprocket journaled in the housing, a slide bearing for the sprocket, a drive shaft and transmission mechanism between said shaft and sprocket, a motor shaft, and a slide sleeve between the motor shaft and the drive shaft.

3. The combination in a portable sawing machine with an upright structure and a vertically adjustable cross head thereon, of a bearing block forming part of the cross head, a rotatable coupling sleeve supported in the block and means for securing the sleeve in adjusted position, a motor secured to the sleeve and driving mechanism of the motor operating in the sleeve, a housing secured to the sleeve at the side of the upright structure remote from the motor, and transmission mechanism for the sawing machine carried in the housing and operatively connected with the driving mechanism.

4. The combination in a portable sawing machine with an upright supporting structure and a movable cross head thereon, of a coupling sleeve rotatable in the cross head, means for retaining the sleeve in fixed position, a motor rigid with the sleeve at one side of the structure, a housing rigid with the sleeve at the opposite side of the structure, and saw operating parts carried within the sleeve and housing.

In testimony whereof I affix my signature.
KNUTE BERG.